United States Patent

Wang

[11] Patent Number: 5,704,210
[45] Date of Patent: Jan. 6, 1998

[54] INTERCOOLED SUPERCHARGED GAS GENERATOR ENGINE

[76] Inventor: Lin-Shu Wang, 21 Hawks Nest Rd., Stony Brook, N.Y. 11790

[21] Appl. No.: 671,274

[22] Filed: Jun. 27, 1996

Related U.S. Application Data

[63] Continuation of Ser. No. 319,619, Oct. 7, 1994, abandoned, which is a continuation-in-part of Ser. No. 150,545, Nov. 10, 1993, abandoned, which is a continuation of Ser. No. 810,728, Dec. 18, 1991, abandoned.

[51] Int. Cl.$^6$ ..................................................... F02C 5/06
[52] U.S. Cl. ........................................... 60/722; 60/598
[58] Field of Search .................... 60/597, 598, 605.1, 60/624, 722, 39.75; 123/559.3

[56] References Cited

U.S. PATENT DOCUMENTS

| | | | |
|---|---|---|---|
| 1,634,797 | 7/1927 | Newton | 60/605.1 |
| 1,849,170 | 3/1932 | Buchi | 60/605.1 |
| 2,979,887 | 4/1961 | Homola | 60/598 |
| 4,508,090 | 4/1985 | Rembold | 123/559.3 |
| 4,700,542 | 10/1987 | Wang | 60/598 |

FOREIGN PATENT DOCUMENTS

| | | | |
|---|---|---|---|
| 40207 | 3/1977 | Japan | 60/605.1 |
| 200434 | 12/1938 | Switzerland | 60/598 |

*Primary Examiner*—Michael Koczo
*Attorney, Agent, or Firm*—Schweitzer Cornman Gross & Bondell LLP

[57] ABSTRACT

A gas generation engine having improved fuel economy and performance comprises a gas generator in the form of a supercharged internal combustion engine coupled to an expander in the form of a gas turbine. The exhaust produced by the internal combustion engine is utilized to drive the turbine. The values for the supercharging pressure ratio and internal combustion engine exhaust back pressure are chosen such that increased thermal efficiency and power output can be simultaneously obtained. The value for the peak cylinder pressure is significantly higher than the typical value for existing diesel engines. The form of internal combustion engine may be a four-stroke cycle piston engine with intercooled supercharging, the internal combustion engine driving the supercharger as well as providing the turbine input. The exhaust for the internal combustion engine may be further divided into two parts, coupled to different stages of the turbine, to more efficiently match the pressure characteristics of the exhaust to the turbine.

9 Claims, 6 Drawing Sheets

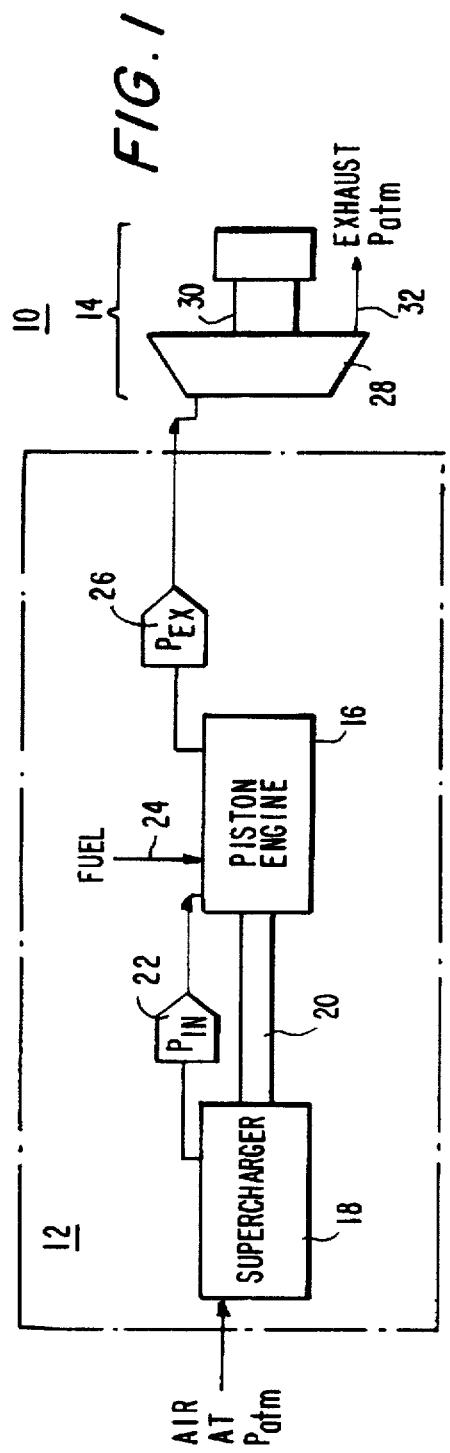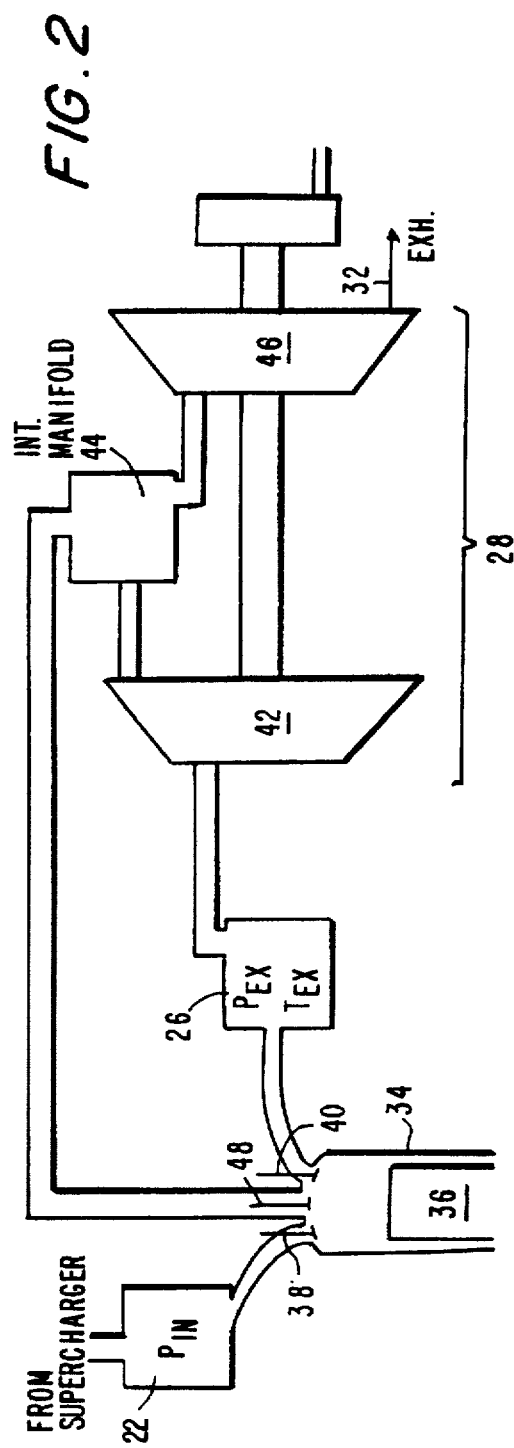

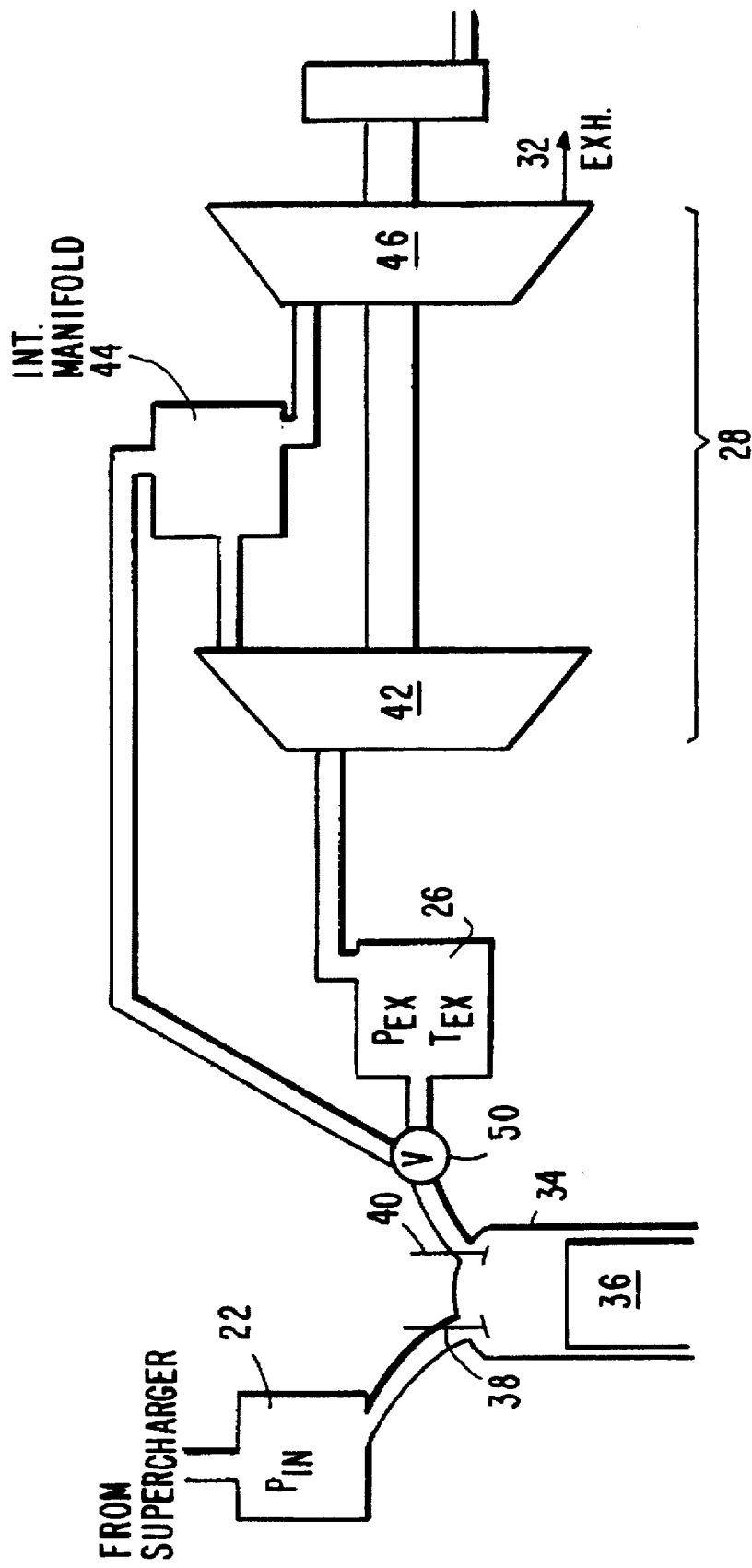

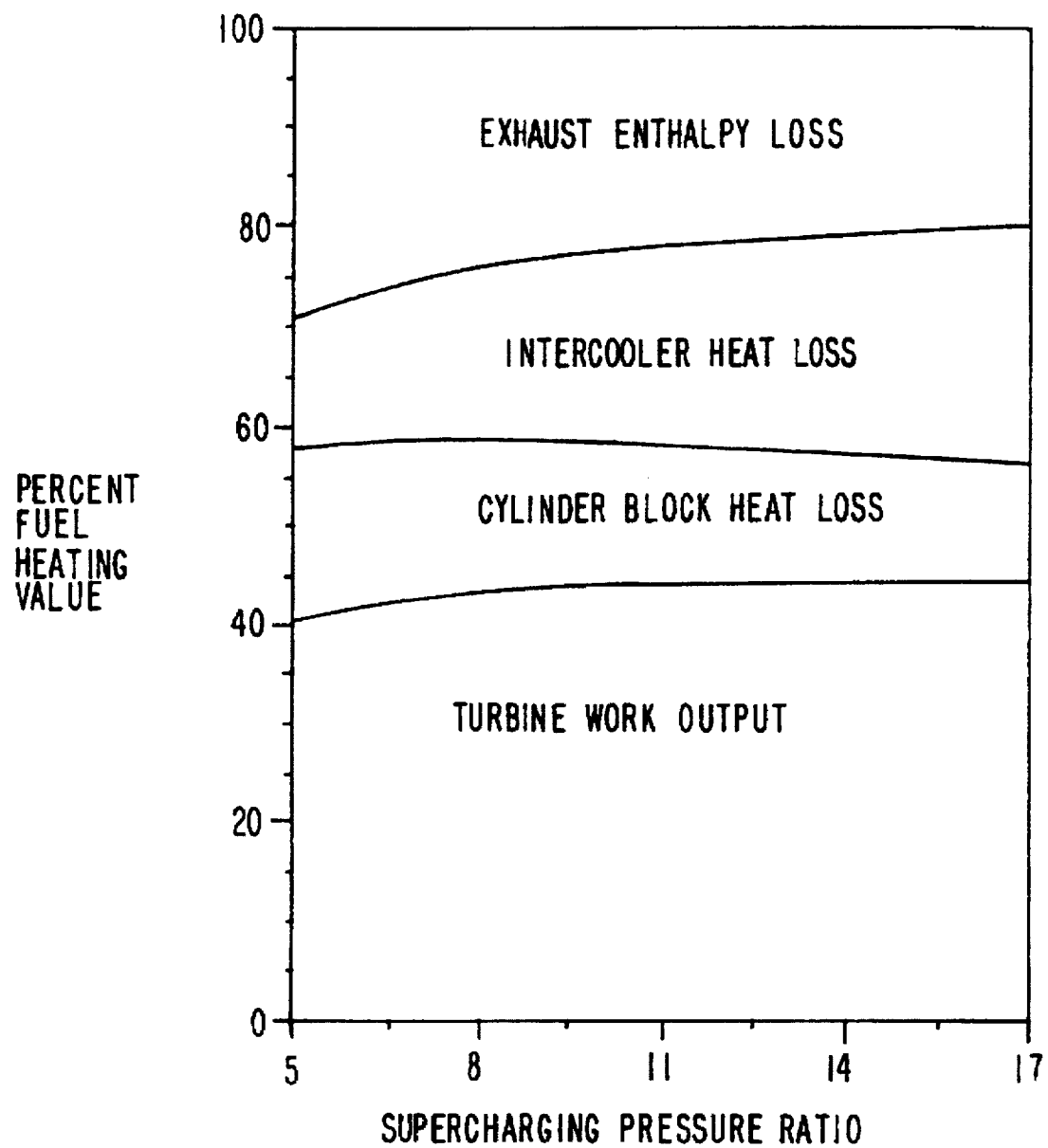

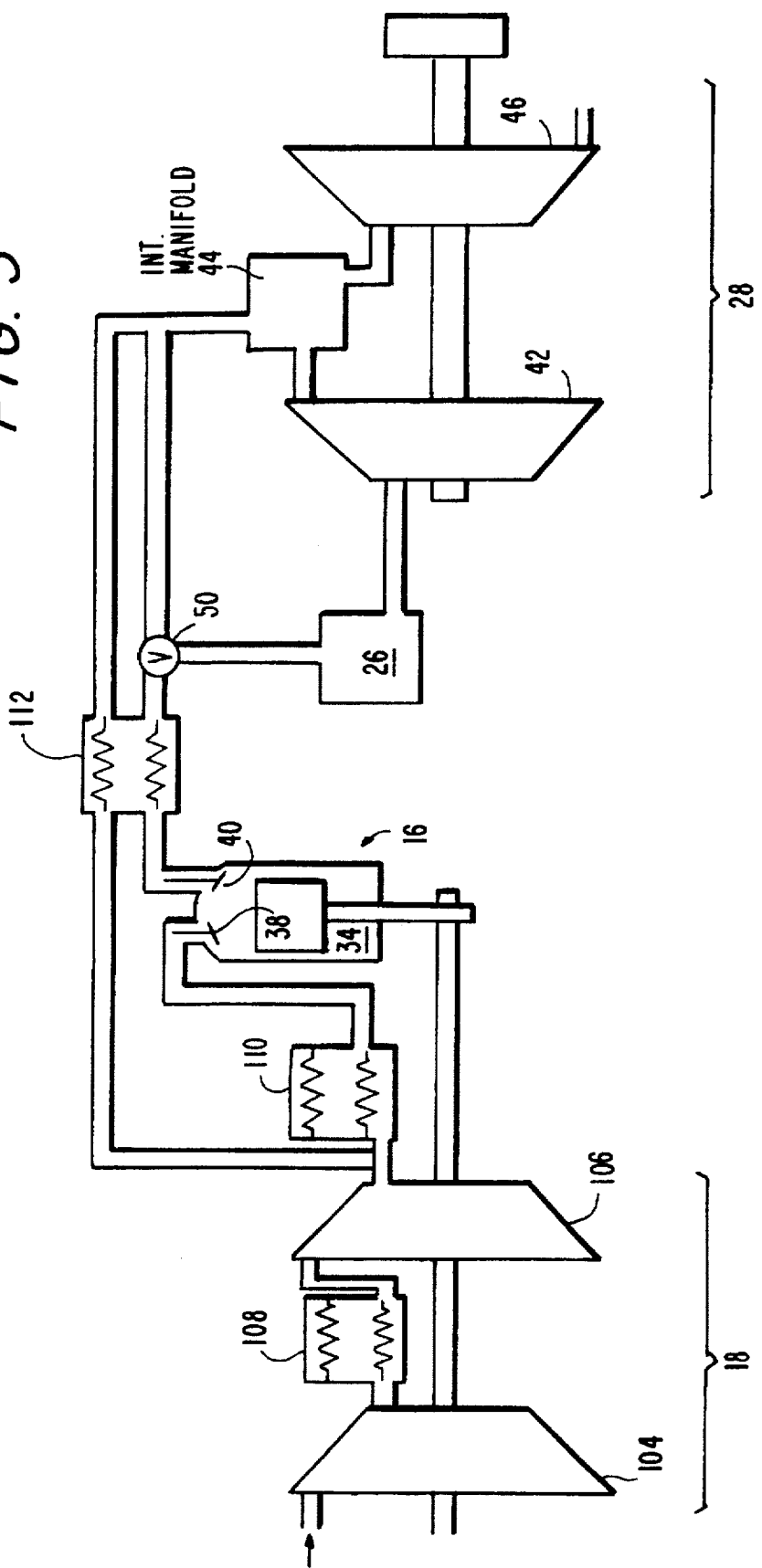

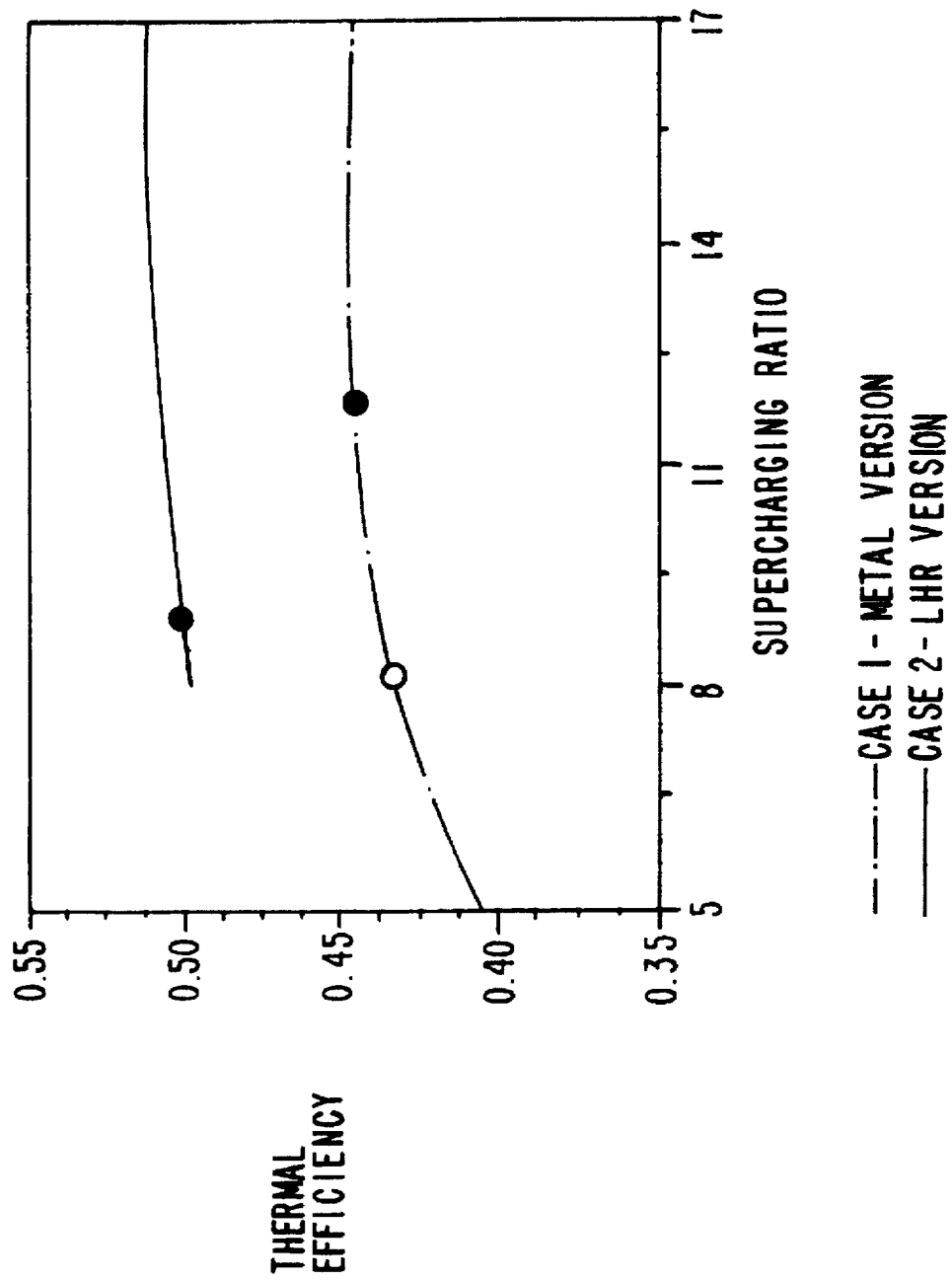

INTERCOOLED SUPERCHARGED GAS GENERATOR ENGINE

This is a continuing application of U.S. Ser. No. 08/319,619, filed on Oct. 7, 1994 now abandoned, which is a Continuation-In-Part of U.S. Ser. No. 08/150,545 now abandoned, filed on Nov. 10, 1993, which is a Continuation of U.S. Ser. No. 810,728, filed Dec. 18, 1991, now abandoned.

The present invention relates to a new and improved engine that is based on the intercooling-supercharging principle, incorporating certain advantageous attributes of both gas turbine and piston-cylinder engines. The contents of Ser. No. 150,545 are incorporated herein by reference.

BACKGROUND OF THE INVENTION

Common engines for automotive use and low power-output industrial-systems are gasoline and diesel engines, both versions of the piston/cylinder engine format. Although developed to a relatively high art, such engines are of relatively large physical size with respect to their power output.

With the development and perfection of ceramic materials adopted for use in heat engines, the potential for improvement of the thermal efficiency of heat engines becomes achievable. This technology, however, cannot be applied to the benefit of piston engines that are based on the Otto-cycle or diesel-cycle principles. The already large exhaust energy loss of conventional piston engines will become larger in ceramic piston engines; any reduction in needed engine cooling resulting from a higher operating temperature will lead only to a nominal increase in brake work, but with a great increase in exhaust energy loss.

The gas turbine engine has long been considered to be an attractive powerplant: the gas turbine is compact; has favorable combustion characteristics, thus, low emissions; and can be greatly improved in performance by adoption of continuously improving high-temperature materials technology, such as ceramic technology. While the gas turbine engine has achieved great success in connection with aircraft systems, it has not been effectively utilized in connection with automotive and industrial technologies.

Several reasons exist for this unsuitability. First, an automotive engine requires the capability to provide output over a wide load range. Simple-cycle and regenerative-cycle gas turbine engines, though of moderate thermal efficiency at full load, have a very low thermal efficiency at part load. The resulting overall fuel economy in an automotive-type environment is thus poor. In recent years in several experimental projects, gas turbine engines have been used in a hybrid-drive powertrain of series configuration, thus avoiding the drawback of poor efficiency over a broad load range.

Secondly, the optimum power range in which a gas turbine achieves optimum performance is higher than the typical automotive power requirement. The level of performance of the compressor and turbine units of a gas turbine engine depends on the Reynolds numbers of the units. This dictates that the smaller the compressor and turbine, the higher the speed they must operate at. The combination of high speed and the precise manufacturing tolerances thus required for such automotive and low-power industrial units make them difficult and expensive to design and build within the constraints of present technology. Other gas turbine drawbacks, such as poor throttle response and small mass specific power, also militate against their general use in automotive power plants.

A solution to the problems in "downscaling" of a gas turbine—while preserving the two advantages of compactness and performance improvement using high temperature materials—is the adoption of a "composite engine" arrangement. It is recognized that the piston engine is highly suited to deal with relatively small volumes at high pressures and temperatures, while a turbine, by virtue of its high mechanical efficiency and large flow areas, is best suited to deal with large volumes at relatively low pressures. A combination of both elements in a series arrangement would appear to remove many of the problems existing with the individual units.

From the turbine side, the difficulty of developing a system to deal with small volume, high speed and high temperatures is removed; a piston "engine" unit can easily handle the small volume and high temperature requirements.

From the piston side, the inefficient gas exchange process of the piston engine is mitigated by the very high "power boosting" of the supercharging (or turbocharging) compressors. In addition, the large exhaust energy loss as a result of the limited expansion available in the positive displacement engine can be overcome by the potentially much greater expansion of the working fluid in the turbine. This economy is especially prevalent when the "composite engine" is based on an intercooling-supercharging power cycle so that the working fluid experiences the most favorable expansion pressure ratio for maximum thermal efficiency. Known existing "composite engine" methods, however, have not been based on the intercooling-supercharging power cycle.

Presently existing "composite engines" are generally of three types: the turbocompounding engine, the gas generator engine, and the turbocharging engine. The turbocompounding engine is exemplified by the Napier E 145 Nomad aircraft engine which requires complex gearing in order to overcome its poor power-speed characteristics.

The application of the intercooling-supercharging power cycle principle to the turbocharging engines will be considered elsewhere.

The gas generator engine is considered to be a more versatile power unit than the turbocompounding engine. Complex gearing is not needed, and the power-speed characteristic is excellent. A typical gas generator engine consists of a compression unit, a piston unit for combustion and driving of the compression unit, and a power turbine unit. The compression "unit" and piston "unit" may be indivisible, as in the case of the free-piston engine. In a gas generator engine system, the pressure ratio of the working fluid's expansion in the power turbine is equal to the product of the supercharging compression pressure ratio, $P_{Super}$, in the compression unit and the ratio of the exit back pressure to the intake pressure of the piston unit, $P_{Back}/P_{Super}$. Thus, maximum power output of the engine is dependent upon the piston unit obtaining high $P_{Back}/P_{Super}$ values. Since raising $P_{Back}$ will also increase exit temperature $T_{Back}$ and thus gas peak temperature in the piston/cylinder unit, the thermal efficiency of the gas generator engine is also dependent on $P_{Back}$.

Existing gas generator engines are either the shaftless, free-piston type or the shafted type based on two-stroke piston engines. For either type, $P_{Back}/P_{Super}$ must be smaller than unity, because such engines rely on the intaking charge to scavenge or drive the burned charge out of the cylinder. A $P_{Back}/P_{Super}$ ratio above unity would prevent burned charge removal through the exhaust port. This requirement is a handicap to power output and thermal efficiency. Such a gas generator engine is often even less efficient than the conventional diesel engine.

The existence of an optimum $P_{Super}$ in an intercooled supercharged internal combustion engine, as partially disclosed in U.S. Pat. No. 4,700,542, is not recognized in existing gas generator engines either.

It is accordingly the purpose of the present invention to provide a method for the design of gas generator engines— by determining the optimum $P_{Back}$, $P_{Super}$, and $P_{Peak}$— which maximizes the thermal efficiency/engine specific power and thus transforms gas generator engines into superior internal combustion engines matching the power-output of gas turbine engines and surpassing the thermal efficiency of diesel piston engines. Such engines may fulfill the demand of the future propulsion task.

A further purpose of the present invention is to provide methods for the design of the piston/cylinder unit of gas generator engines whereby the exhaust pressure, $P_{Back}$, of the piston/cylinder unit may be raised to the optimum value for maximizing the thermal efficiency.

Yet another purpose of the present invention is to provide a method for the design of low heat rejection gas generator engines that can fully benefit from adopting high-temperature materials for increasing thermal efficiency by reducing the engine block cooling loss-keeping the exhaust energy low with intercooling-supercharging.

Still another purpose of the present invention is to provide an improved gas generator engine in accordance with the foregoing methods.

BRIEF SUMMARY OF THE INVENTION

The present invention, is incorporated into the design of an Intercooled supercharged gas GENerator ("IGEN") engine, comprises an intercooled supercharged gas generator coupled to a power turbine or other expander. The intercooled gas generator unit transforms fuel and air into a high-temperature and high-pressure charge, and may take the form of a piston component and an intercooled supercharger component which is driven, mechanically or with other means, by the piston component. The power turbine unit transforms the high-temperature and high-pressure charge into useable brake work and a low-temperature charge exhaust at atmospheric pressure. The two units are linked pneumatically.

The connecting pressure—the gas generator back pressure, $P_{Back}$, which equals to the turbine inlet pressure— is determined by the matching selection of the two units. It is advantageous to shift charge expansion enthalpy away from the gas generator unit into the power turbine unit. In order to raise $P_{Back}$ over $P_{Super}$, a two-stage power turbine is matched with a four-stroke piston component (of the gas generator unit) with a two-phase exhaust stroke: a main exhaust phase and a scavenging exhaust phase. The most advantageous matching selection of the two units is characterized by an optimum value of s, which is defined as $$s = (P_{Back}/P_{Super})(P_{Super})^{\beta}$$

where $\beta$ is a constant exponent. Preliminary investigations indicate that $\beta$ is about 0.5. Both $\beta$ and s are to be determined by design optimization study. More on the optimization procedure is discussed in the following.

The introduction of intercooled supercharging presents another new variable, defined as $$r = \frac{1}{2} \ln P_{Super} / \ln(P_{Peak}/P_{Super}),$$

the optimum value of which characterizes the most advantageous supercharging pressure ratio, $P_{Super}$. ($P_{Peak}$ is the peak cylinder pressure.) With the introduction of the two pressure-related variables, r and s, for the IGEN engine, the single-variable search for the optimum $P_{Peak}$ for the Otto or diesel engine cycle is transformed into a three-variable search for the set of optimum values—r, s, and $P_{Peak}$—for the IGEN engine.

A brief mathematical description of the three-variable univariate search (its embodiments in term of engine operating characteristics will be discussed in the Detailed Description section) is given as follows: Choose a set of r and $P_{Peak}$ constants. Along these constants, find s value that produces maximum thermal efficiency. Along the same constant $P_{Peak}$ and the constant s value as determined, vary r value until maximum thermal efficiency is found. In the third univariate step, s and r are kept at their respective constant values as determined, and $P_{Peak}$ is increased until the point that is near both maximum thermal efficiency and maximum engine specific power; $P_{Peak}$ at this point is the new constant $P_{Peak}$ value. This three-step univariate search is to be repeated until the difference between new s and r values and their old values is sufficiently small. The optimum set of s, r, and $P_{Peak}$ is then approximately determined.

The steps of finding s value for maximum thermal efficiency under constant r and $P_{Peak}$, of finding r value for maximum thermal efficiency under constant s and $P_{Peak}$ also lead to simultaneous increase in power-output. Performance of a gas generator engine may be expressed in terms of thermal efficiency, mass specific power, and charge density at the onset of compression stroke, as follows:

$$\eta_{th} = \eta_{th}(P_{Peak}, r, s; T_{cylinder})$$

$$p_{mass} = p_{mass}(P_{Peak}, r, s; T_{cylinder})$$

$$\rho_{ref} = \rho_{ref}(P_{Peak}, r, s; T_{cylinder})$$

At the optimum s and r, the corresponding optimum $P_{Peak}$ of the present invention is significantly higher than the typical optimum $P_{Peak}$ for diesel engines. The additional pressure-related variables introduced from the intercooling-supercharging concept lead to the multi-variable search optimization that unfolds a higher performance zone— significantly higher thermal efficiency and drastically higher engine specific power—that lay hidden and unavailable to the single-pressure-variable search optimization of the Otto cycle and diesel cycle.

These exceptional results of the invention as compared with the prior art are realized under the following conditions:

I. Matching selection of the gas generator and the expander so that $P_{Back}$ corresponds to the optimum s; the piston component exhaust process being designed to accommodate the piston back pressure;

II. Selection of the supercharger with a pressure ratio, $P_{Super}$, and the piston component with a compression ratio corresponding to the optimum r; and III. obtaining the highest possible piston compression ratio and matching supercharger and expander corresponding to the optimum $P_{Peak}$—subject to mechanical load considerations.

A fuller understanding of the present invention and the attributes thereof may be obtained upon consideration of the following detailed description of preferred illustrative embodiments when reviewed in conjunction with the annexed drawings.

BRIEF DESCRIPTION OF THE DRAWINGS

FIG. 1 is a block diagram of the components of the present invention;

FIG. 2 is a representation of the interface between the piston and expansion elements depicting a dual piston exhaust valve configuration;

FIG. 3 is an alternative exhaust valve structure for the embodiment of FIG. 2;

FIG. 4 is a preliminary result of various energy losses as a function of the supercharging pressure ratio;

FIG. 5 is a representation of a modified version of the embodiment of FIG. 3 wherein a near-stoichiometric fuel mixture is used in the piston unit;

FIG. 6 is a preliminary prediction of thermal efficiency of the Low Heat Rejection version of the embodiment as compared with the standard metal version with cooling.

DETAILED DESCRIPTION OF PREFERRED EMBODIMENTS

Figure 5A:
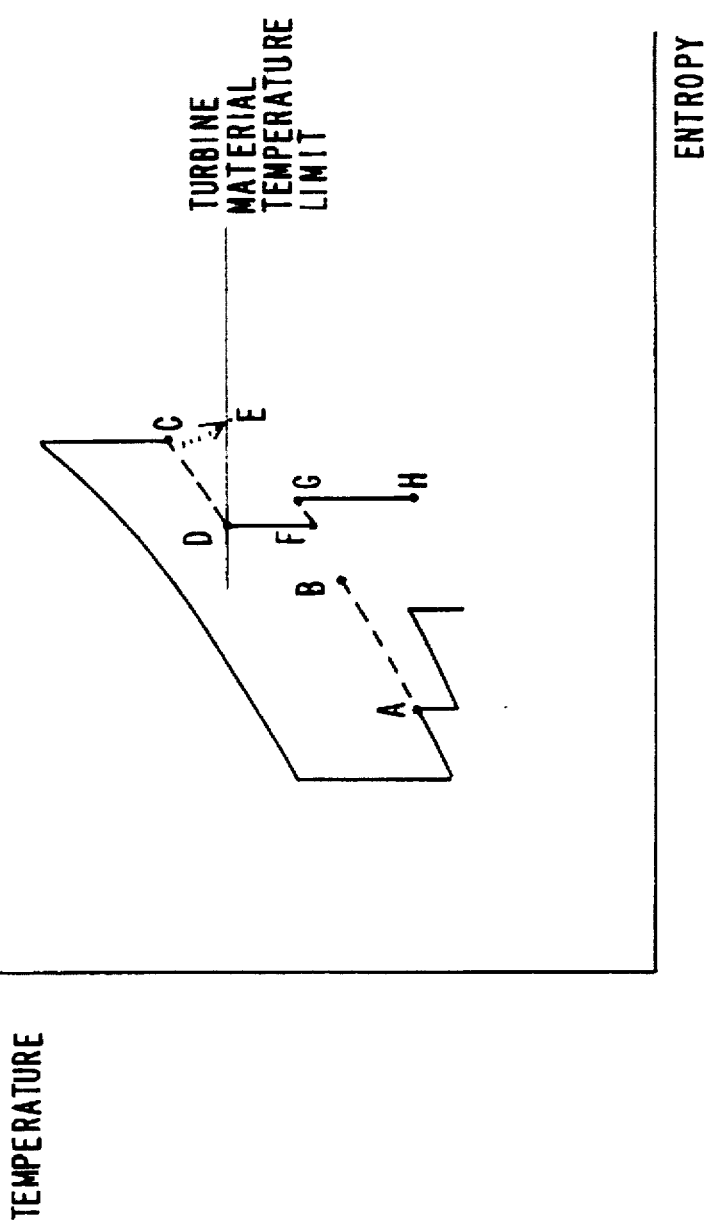
FIG. 5A is a temperature-entropy diagram for the embodiment of FIG. 5.

FIG. 1 depicts the generalized arrangement of the elements of an IGEN engine 10. Intercooled gas generator unit 12 provides a high temperature and pressure input for expansion unit 14 to which it is coupled. The gas generator unit 12 may preferably comprise a piston engine unit 16 which is coupled mechanically, or with other coupling means such as magnetic coupling, to a compressor or supercharging unit 18 by "shaft" 20. The compressor 18 includes intercoolers as known in the art. The output of the compressor unit 18, powered by the piston unit 16, is a stream of working fluid 22 at an elevated pressure $P_{Super}$ which is combined with the fuel 24 and ignited within the cylinders or combustion chambers of the piston engine unit 16 to form an exhaust charge 26 at an elevated temperature $T_{Back}$ and pressure $P_{Back}$. This charge is passed through the expander 14, typically comprising a power turbine 28, which produces a work output on shaft 30. The exhaust 32 from the turbine 28 is returned to the atmosphere at atmospheric pressure.

As previously stated, the piston back pressure in existing piston engines is chosen to be slightly less than the piston inlet pressure. This small difference serves to scavenge the burned gas from the piston engine cylinder. With the piston engine utilized as a gas generator, the matching power turbine is selected such that its pressure ratio vs mass flow rate characteristics accept an inlet pressure equal to this piston back pressure.

The piston engine of the present invention is preferably a four-stroke configuration, its exhaust process characteristics chosen for flexible $P_{Back}$ values, relative to $P_{Super}$, that may match with the power turbine 28. A power turbine may be selected such that its pressure ratio (input pressure vs output pressure) versus mass flow rate characteristic is such that the turbine's inlet pressure, corresponding to the piston back pressure, is equal to the optimum $P_{Back}$, defined by the optimum s. This optimum represents the most advantageous distribution of charge expansion enthalpy between the piston component of the gas generator unit and the expander unit.

Based on the design optimization consideration, $P_{Back}$ and hence the charge pressure during the exhaust stroke is to be maintained at a value higher than $P_{Super}$. Since the intake process to the cylinder cannot take place until the charge pressure within the cylinder drops to the input pressure, there can be no overlap of operation of the exhaust and input valves, or exhaust through the input valve would occur. Instead, the exhaust valve must close almost at top dead center. To lower piston pressure without adversely affecting the $P_{Back}$ for the turbine, however, an additional scavenging-exhaust valve is provided, as illustrated in FIG. 2. This valve opens simultaneously with the closing of the exhaust valve 40 and opens to a manifold 44 maintained at a pressure slightly lower than $P_{Super}$ and remains open until adequate scavenging is effected. Thus, the exhaust process includes the following steps:

1. The exhaust valve opens a few crankcase degrees before bottom dead center.

2. The exhaust valve closes immediately after the piston reaches top dead center.

3. Simultaneously with the exhaust valve closing the secondary scavenging exhaust valve opens.

4. Charge scavenging continues as the intake valve opens at a crank angle after top dead center. As the scavenging manifold is at a pressure below $P_{Super}$, exhaust continues to be removed from the cylinder.

5. The scavenging exhaust valve closes and the intake process begins.

The above process, creating a pair of exhausts at different pressures, thus requires that the power turbine or expander be designed as a two-stage turbine. The $P_{Back}$ charge passing through the first stage expands from $P_{Back}$ to a pressure slightly below $P_{Super}$ in an intermediate manifold. The expanded charge passing thereinto is joined by the additional charge mass directly from the cylinder through the scavenging exhaust valve. This combined charge is then passed through the second stage of the turbine, wherein it further expands from the intermediate pressure to the atmospheric pressure.

As shown in FIG. 2, cylinder 34 having piston 36 receives the pressurized input 22 at pressure $P_{Super}$ through input valve 38 in a conventional manner. The high pressure and temperature exhaust 26, at $P_{Back}$, $T_{Back}$, is discharged through primary exhaust valve 40, which opens during the exhaust cycle and remains open until the piston 36 reaches top dead center. The exhaust 26 expands through first turbine section 42, exiting into an intermediate manifold 44 between the two stages 42 and 46 of the turbine 28. The intermediate manifold 44 is designed to operate at a pressure slightly below $P_{Super}$, which is of course below $P_{Back}$, and thus has an operating pressure below that of $P_{Back}$. At top dead center the exhaust valve closes, and secondary scavenging exhaust valve 48 opens. Scavenging valve 48 directs the remaining exhaust to the intermediate manifold 44 where it is combined with the exhaust from the first section 42 of turbine 28. The intermediate manifold 44 serves as the input to the second stage turbine 46, wherein additional mechanical energy is extracted from the exhaust, which exits the second stage as 37 at atmospheric pressure.

In FIG. 2, scavenging exhaust valve 48 is shown as a "poppet" valve, similar in operation to the conventional input and exhaust valves 38, 40 of the cylinder. Such a design requires relatively complex linkages about the cylinder head and may require substantial modification of conventional cylinder head design to physically accept the positioning of an additional valve. Accordingly, an alternative to the poppet design is shown in FIG. 3. As shown therein, a rotary valve or other type of valve 50, which may be displaced from the cylinder 34, operates in conjunction with conventional poppet exhaust valve 40, and is timed to direct the exhaust charge either to the first stage 42 of the turbine 28 or to the lower pressure, intermediate manifold 44. By placing the valve 50 away from the piston and cylinder, substantial redesign of the cylinder head is avoided. Instead, the total open time for the exhaust valve 40 need only be modified to encompass the time needed to transfer both portions of the charge exhaust.

The compression ratio of the piston engine component is selected with a matching intercooled supercharging compressor of $P_{Super}$ so that the gas generator unit corresponds to the optimum r and $P_{Peak}$. The existence of the optimum r is a result of the expected reduction in cylinder heat loss, piston friction loss, expander exhaust enthalpy loss against increasing $P_{Super}$. A preliminary result is shown in FIG. 4. A reduction in cylinder heat loss, piston friction loss, and expander exhaust enthalpy loss is predicted, while the intercooling loss increases. At the optimum r, the sum of various thermodynamic availability losses is minimized. This reduction in availability losses results from intercooled supercharging. Without intercooling, supercharging boosts only power, not thermal efficiency.

Without intercooling the optimum $P_{Peak}$, due to adiabatic supercharging and piston-compression, remains at about the same level of existing diesel engines. With intercooling, the optimum $P_{Peak}$ of the present invention is significantly higher than that of the Otto and diesel cycles with correspondingly higher thermal efficiency and engine specific power.

A multi-variable univariate search optimization determines the optimum r, s, and $P_{Peak}$. The optimum $P_{Peak}$, $P_{Super}$ and $P_{Back}$ are thus identified, and the appropriate components selected. The previously-stated three conditions based on the optimization consideration and component selection can be set forth in terms of their physical meaning:

I. The optimum s represents the most advantageous distribution of charge enthalpy between the gas generator unit and the expander unit (for gas generator engines, charge enthalpy should be shifted from the piston engine to the expander; for turbocharging engines, charge enthalpy should be shifted from the exhaust-driven turbine to the piston engine).

II. The optimum r represents the condition of minimum thermodynamic availability losses: engine exhaust, cylinder cooling, piston friction, etc.

III. The optimum $P_{Peak}$ represents the condition that is near both the maximum thermal efficiency and the maximum engine specific power of the intercooled-supercharged-cycle gas generator engine.

A very high $P_{Super}$ (=14) is predicted. The compression ratio of the piston engine corresponding to the optimum $P_{Peak}$ is yet to be determined by the optimization study. The possibility of a low compression ratio, either predicted by the optimization study or dictated primarily by the maximum pressure limit of the cylinder block, coupled with use of charge intercooling in the supercharger, results in a low charge temperature at the end of the compression stroke. This thus may rule out the use of compression ignition combustion. Depending on the optimization conditions, the maximum fuel-air ratio may be limited to values less than stoichiometric. Accordingly, spark ignition combustion engines running on lean mixtures, such as a stratified charge combustion engine or a multi-port injection engine capable of leaner burning as known in the art will be preferred choices for adoption as the piston component of IGEN.

Spark ignition engines running on near-stoichiometric mixtures can be adopted, however, for use as the piston unit for IGEN with the following modification. Such piston engines must be matched with "oversized" supercharging compressors. The necessary modification is described in FIGS. 5 and 5A, in which a multiple stage compressor with interstage cooling is employed as the supercharger.

Compressor unit 18 is of multiple stage design, having compressors 104, 106 followed by heat exchanger/coolers 108, 110, respectively.

"Excess" air from the final (second) supercharging compressor 106 at state A bypasses the final stage intercooler 110 and the piston unit 16 and instead enters into a heat exchanger unit 112 around the piston exhaust manifold. As a result of heat exchange the bypass air is heated from A to B and the piston exhaust is cooled down from C to D and then cooled during blowdown from C to E. The piston exhaust is still directed to the primary input of first expander 42 of the turbine 28 and, after partial cooling and further blowdown, to the lower pressure intermediate manifold 44. The first expansion is represented by the line segment D–F. The heated bypass air at state B and first stage turbine exiting charge at state F join the piston scavenging exhaust at state E in the intermediate manifold 44 to form a mixture at state G. Additional mechanical energy is extracted from the expansion of the mixture from G to H in the second stage 46 of the turbine. The turbine material temperature limit sets the limit for the gas temperature at D. In this version, the piston exhaust temperature at C can be higher than the turbine material temperature limit as the piston exhaust is first used to heat the bypass air before it comes into contact with turbine at D.

Significantly higher $P_{Peak}$ than that of the prior art is expected. The resulting high power output imposes a great challenge to the problems of piston side force, piston rod load, crank-shaft load, and crank-shaft bearing load. A crank-less option may be especially attractive for the present invention. One possibility is that the piston engine component may be magnetically coupled to the supercharging compressor, as known in the art of free-piston Stirling engine which is magnetically coupled with a driven compressor.

In Low Heat Rejection (LHR) gas generator engines, the cylinder wall temperature is raised to a higher value with resulting reduced engine block cooling. Performance of a gas generator engine may be expressed in terms of thermal efficiency, mass specific power, and charge density at the onset of compression stroke:

$$\eta_{th} = \eta_{th}(P_{Peak}, r, s; T_{cylinder})$$

$$\rho_{mass} = \rho_{mass}(P_{Peak}, r, s; T_{cylinder})$$

$$\rho_{ref} = \rho_{ref}(P_{Peak}, r, s; T_{cylinder})$$

With higher $T_{cylinder}$ of LHR engine, a different set of optimum r, s, and $P_{Peak}$ is to be determined. Significantly higher performance is expected. A preliminary prediction of the thermal efficiency is represented as the solid curve in FIG. 6, which is shown against the thermal efficiency of the standard metal engine with cooling, represented as the broken curve.

I claim:

1. An improved gas generator engine, comprising an expander having a high pressure inlet port, a low pressure exhaust port and an output shaft for generating brake work; a gas generator comprising a piston engine unit having an air input port, an exhaust port and an output shaft, an intercooled supercharger driven by said piston engine unit output shaft and coupled to said piston unit air input port, said piston engine output shaft being coupled solely to said supercharger, said piston engine unit being coupled through its exhaust port to said expander inlet port for generating a gas input for said expander and having a elevated output pressure $P_{Back}$, said piston engine unit further having means for controlling its back pressure to shift charge expansion enthalpy from said piston unit to said expander, said controlling means comprising means for dividing an exhaust from said piston engine unit into a first portion at pressure $P_{Back}$ for a maximum portion of an exhaust interval of said piston engine unit and a second portion at a pressure lower than $P_{Back}$ for a minimum portion of the exhaust interval required and timed to allow input air to be received by a cylinder of the piston engine unit.

2. The engine of claim 1, wherein said gas generator comprises a supercharged four-stroke piston engine unit having inlet and exhaust ports, the exhaust port thereof being coupled to the input port of said expander.

3. The apparatus of claim 2, wherein said means for dividing the exhaust into first and second portions comprises a piston cylinder having first exhaust valve means adapted to operate during a time interval commencing before piston bottom dead center and ending at top dead center during which period said first exhaust portion is defined, and second exhaust valve means adapted to operate during a second time interval commencing at top dead center and ending slightly thereafter during which period said second exhaust portion is defined, said first exhaust valve means being coupled to said expander inlet port and said second exhaust valve means being coupled to said expander second inlet port.

4. The apparatus of claim 3, wherein said first and second exhaust valve means are located in the wall of said cylinder.

5. The apparatus of claim 3, wherein said first and second exhaust valve means are mounted in an exhaust manifold for said piston engine unit and are adapted to alternatively connect to said expander inlet port and said second inlet port, said exhaust manifold being coupled to said cylinder through a main exhaust valve.

6. The apparatus of claim 1, wherein said expander has a high and a low pressure stage, said low pressure stage being coupled to a second expander inlet port and to an outlet of said high pressure stage, said high pressure stage being coupled to said expander inlet port; and means for directing said first and second exhaust portions respectively to said expander inlet port and said second expander inlet port.

7. The engine of claim 2, wherein said four-stroke piston engine unit is a spark-assisted, direct-injection engine.

8. The engine of claim 2, wherein said four-stroke piston engine unit is a lean-burning, spark-ignition premixed engine.

9. The engine of claim 2, wherein said four-stroke piston engine unit is a premixed, near-stoichiometric-mixture gasoline engine, said gas generator including a supercharger fluidly coupled to both said gasoline engine unit and directly to said expander.

* * * * *